March 27, 1951 R. S. HUNTER 2,546,450
PHOTOMETRIC COMPARATOR INSTRUMENT
Filed Feb. 23, 1949 3 Sheets-Sheet 3
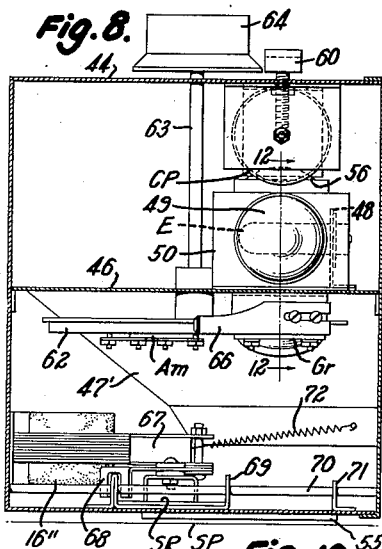
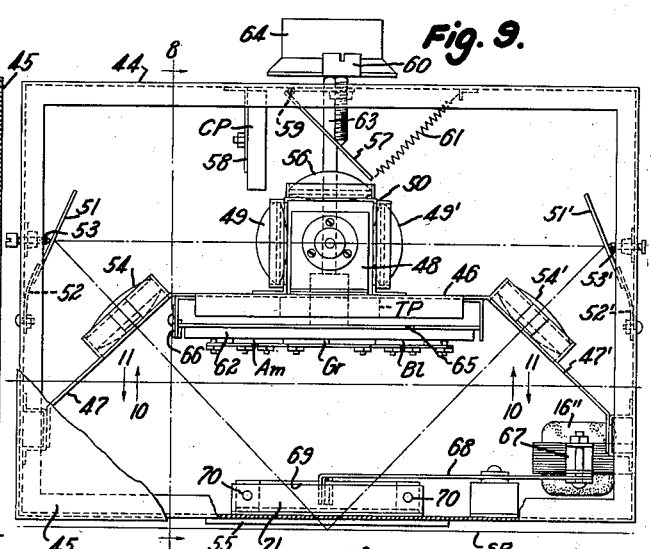
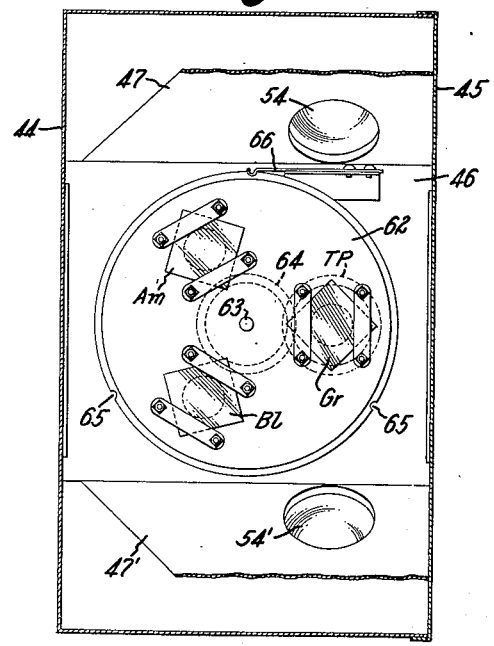
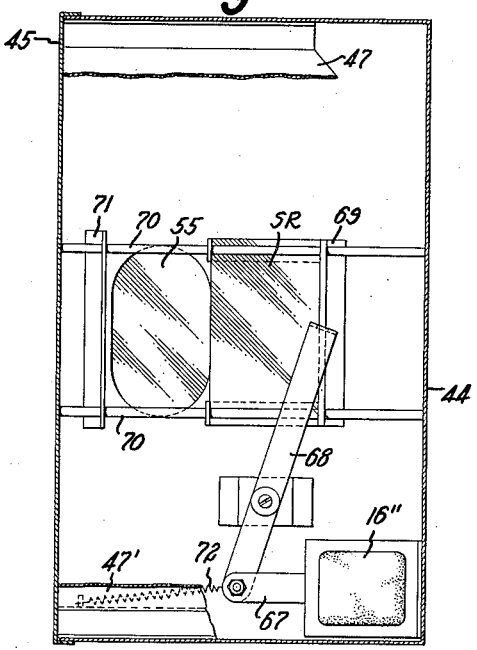
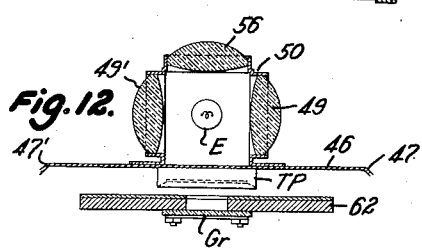
Inventor:
Richard S. Hunter,
By Pierce, Scheffler & Parker,
Attorneys.

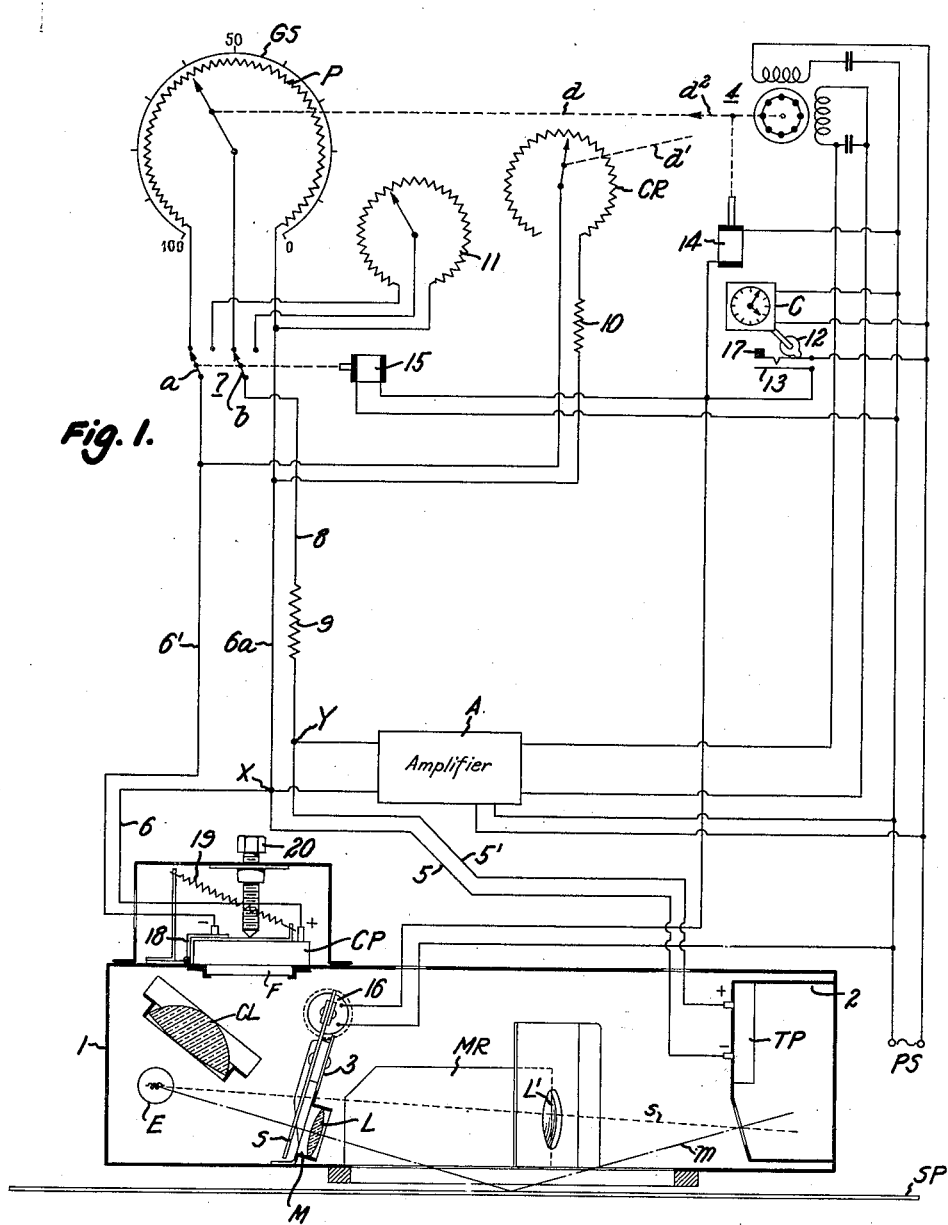

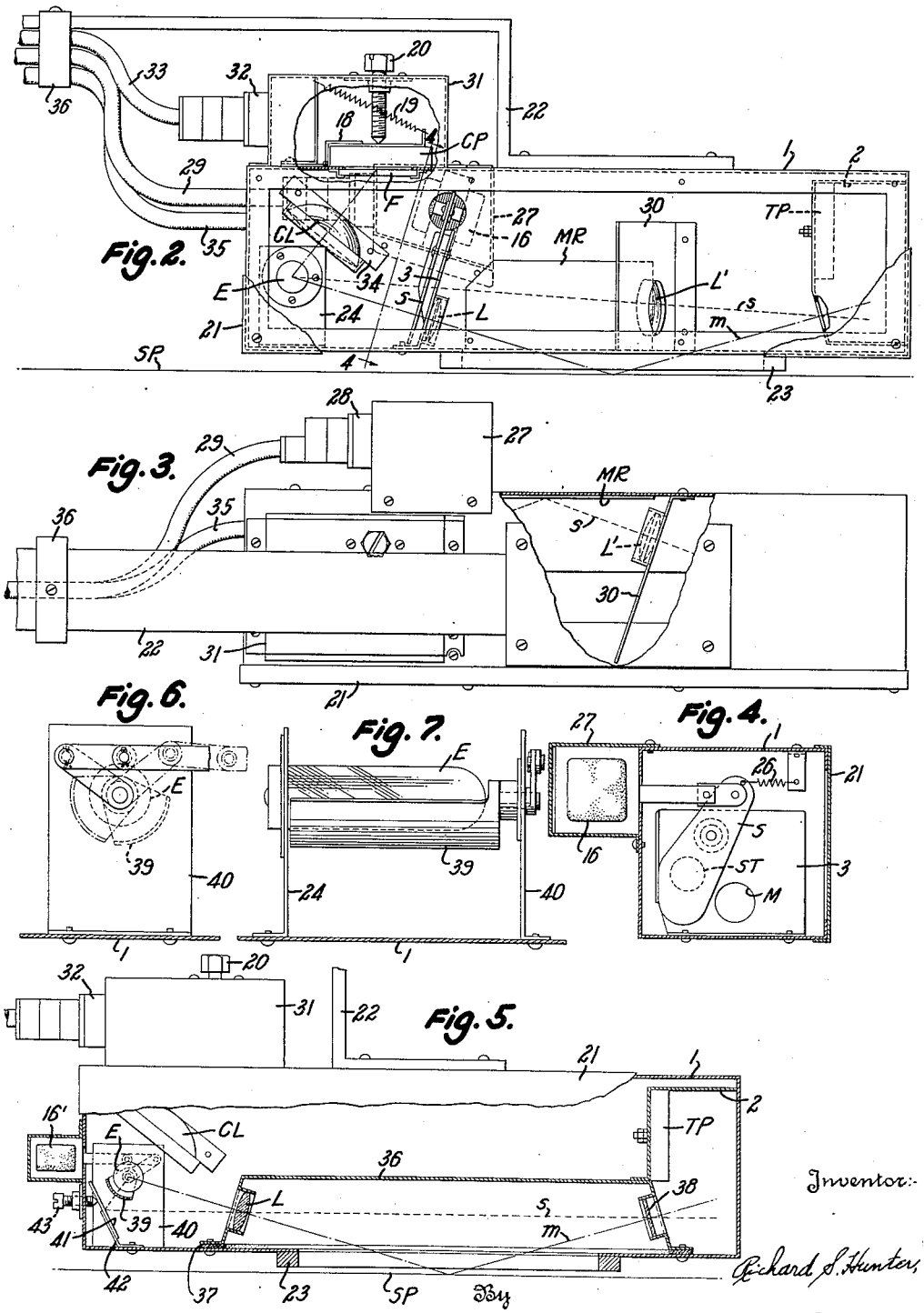

Patented Mar. 27, 1951

2,546,450

UNITED STATES PATENT OFFICE 2,546,450

PHOTOMETRIC COMPARATOR INSTRUMENT

Richard S. Hunter, Franklin Park, Va., assignor to Henry A. Gardner Laboratory, Inc., Bethesda, Md., a corporation of the District of Columbia Application February 23, 1949, Serial No. 77,887

12 Claims. (Cl. 88—14)

This invention relates to photoelectric comparator instruments for measuring, recording and/or controlling an optical value of a test specimen, and more particularly to photoelectric instruments for measuring, recording and/or controlling an optical value, such as the gloss or reflectance of individual specimens or of a moving strip of paper, plastic or a textile material.

Continuous recording apparatus of voltage actuated potentiometer types are well known and are quite satisfactory when they include mechanisms for re-calibration at periodic or manually selected intervals, and such self-calibrating recording apparatus is described, for example, in the Harrison Patent No. 1,931,223 and Caldwell et al. Patent No. 2,424,146. In general, such prior measuring and recording equipment includes a thermocouple or other element for developing a voltage which varies with the magnitude of a factor, for example temperature, which is to be recorded; an energizing voltage source connected through an adjustable resistance network across a potentiometer, and a motor selectively energized to adjust the potentiometer tap to maintain a balance between the thermocouple voltage and the voltage across an adjustable section of the potentiometer. For periodic calibration, the motor drive to the tap of the balance potentiometer is broken, the motor drive is connected to the tap of a calibrating resistance of the adjustable resistance network, and a switch is actuated to substitute a standard voltage source for the thermocouple. If the calibration has drifted due to a change in the potential of the energizing voltage source, the tap of the calibrating resistor is adjusted to re-establish the contemplated voltage drop across the balance potentiometer.

Such prior voltage actuated systems which may include periodic re-calibration mechanism are not adapted, however, for the measuring and/or recording of varying current values developed by photoelectric cells of the barrier layer type which are illuminated in accordance with changes in a factor which is to be measured.

An object of the present invention is to provide photoelectric measuring systems of the current-actuated type which may be standardized or re-calibrated at periodic or manually selected intervals. An object is to provide photoelectric measuring systems which remain continuously in substantially accurate calibration. An object is to provide an exposure head for photoelectric measuring apparatus which includes a light source for illuminating a comparison photoelectric cell and a test photoelectric cell, and mechanism which may be periodically or manually actuated to develop a preselected current output from the test photocell for purpose of calibration.

These and other objects and the advantages of the invention will be apparent from the following specification when taken with the accompanying drawings in which:

Fig. 1 is a schematic diagram of a photoelectric gloss-recording instrument embodying the invention;

Fig. 2 is a side elevation, with parts in section, of an exposure head such as shown schematically in Fig. 1;

Fig. 3 is a top view of the same, with part of the top wall broken away;

Fig. 4 is a transverse section on line 4—4 of Fig. 2;

Fig. 5 is a side elevation, with parts in section, of another exposure head;

Fig. 6 is an enlarged fragmentary elevation of the shutter support and operating mechanism as seen from the rear;

Fig. 7 is a fragmentary end elevation of the lamp mounting and shutter as seen from the right side of Fig. 5;

Fig. 8 is a transverse section through an exposure head for reflectance measurements, as seen on line 8—8 of Fig. 9;

Fig. 9 is a front elevation of the exposure head with the cover plate almost completely broken away, and with some parts in section;

Figs 10 and 11 are horizontal sections through the exposure head taken substantially on the section line indicated by and looking in the direction of arrows 10, 10 and 11, 11 respectively of Fig. 9; and Fig. 12 is a fragmentary vertical section taken on line 12—12 of Fig. 8.

In the schematic diagram of Fig. 1, the reference numeral 1 identifies the housing of a glossmeter exposure head having an opening in its lower wall beneath which a specimen SP may be placed for the measurement of gloss, or beneath which an extended web of material, for example paper in transit through a calendar, may pass for the continuous measurement and/or recording of gloss of the web. The essential elements within the exposure head are a light source E or small electric lamp bulb, a comparison photocell CP which receives light directly from the source E, and a test photocell TP in a white diffusing enclosure or sub-housing 2 which normally receives a light beam $m$ which passes from source E through a measuring opening M in a transverse plate 3 and then, by reflection from the specimen or web SP, into the enclosure 2. In the alternative adjustment of a shutter S for calibration, the measuring beam $m$ is interrupted and a standardizing beam $s$ passes from source E to the photocell enclosure 2 through an opening ST in the plate 3 and then by reflection from a mirror MR.

The gloss of the specimen is measured in terms of the ratio of the currents generated by the photocells CP and TP, the photocells being of the barrier layer or current-generating type. The measuring circuit is of a balancing type in which the current outputs of the photocells are opposed and a voltage balance is obtained at the input terminals X, Y of an electronic amplifier A; an unbalance at the input terminals resulting in the energization of a reversibe motor 4 to adjust the tap of a potentiometer P to vary the voltage developed across the amplifier input terminals X, Y by the current output of the comparison photocell CP.

The terminals of the test photocell TP are directly connected to the voltage balance points X, Y, by leads 5, 5' respectively, and one terminal of the comparison photocell CP is connected to balance point X by a lead 6; the polarity of the terminals of photocells CP and TP which are connected to point X being opposite, for example positive and negative, respectively, as indicated by symbols on the drawing. A jumper or lead 6a extends from the balance point X to one end of the potentiometer P, and the lead 6' from the other terminal of the comparison photocell CP is normally connected through blade a of a double pole-double throw switch 7 to the other end of the potentiometer P. The adjustable tap of potentiometer P is normally connected through blade b of switch 7, lead 8 and a high resistance 9 to the second balance point Y.

A portion of the current output of the comparison photocell CP is by-passed around the measuring potentiometer P by a fixed resistor 10 and adjustable calibrating resistor CR having a tap which may be driven by motor 4 through a drive, indicated schematically by broken line d', when the normal motor drive d to the tap of potentiometer P is broken simultaneously with an adjustment of switch 7 to its alternative position. This adjustment of switch 7 connects a standardizing potentiometer 11 across the comparison photocell leads 6', 6a in place of the measuring potentiometer P, and connects the tap of the potentiometer 11 to the amplifier input terminal Y.

The adjustment of the apparatus from a measuring to a calibrating operation may be made periodically by a clock mechanism C which is energized from the same power source PS, which may be a conventional 110 volt, 60 cycles light and power circuit, which energizes the amplifier A. In a continuous recorder, the clock mechanism also drives the record sheet, not shown, upon which a pen actuated by motor 4 traces a curve of the time-gloss characteristic of the specimen SP. As shown schematically, the clock mechanism C drives a cam 12 which periodically closes a switch 13 to energize solenoids 14, 15 and 16, which actuate, respectively, the coupling $d^2$ between motor 4 and drives d, d', the switch 7, and the shutter S in the exposure head. Switch 13 is preferably provided with a button 17 which may be manually operated, as desired, to effect a recalibration.

The comparison photocell CP is supported within the exposure head on a hinged or flexible strap 18 which is biased away from the light source E by a spring 19 and may be adjusted towards the light source by a screw 20. A collimating lens CL and heat-absorbing filter F are arranged between the light source E and the comparison photocell CP. A lens L is mounted in the opening M of plate 3 to direct the measuring beam m to the opening in the bottom wall of the housing, and a lens L' is positioned to direct the calibrating beam s into the sub-housing 2 of the test photocell TP.

The apparatus is conditioned for an accurate measurement of gloss by setting the tap of the calibrating resistor CR at its midpoint, placing a standard specimen of known gloss beneath the opening of the exposure head housing, and adjusting the screw 20 to set the comparison photocell CP in that position at which the measured value of the gloss, as indicated at a graduated scale GS and/or by the pen position on the recorder chart, is equal to the known value. Switch 13 is then closed by depressing pushbutton 17, thereby shifting the shutter S to direct the standardizing beam s into housing 2 of the test photocell TP, throwing switch 7 to substitute the standard potentiometer 11 for the measuring potentiometer P, and connecting the motor 4 to the drive d' of the tap of the calibrating resistor CR. The tap of potentiometer 11 will usually be in some arbitrary position which results in a disturbance of the voltage balance previously established across the terminals X and Y, and the motor 4 will be energized to drive the tap of the calibrating resistor CR. If this occurs, the tap of the potentiometer 11 is quickly adjusted to, and slightly beyond, the point which re-establishes a voltage balance at terminals X and Y. This remaining unbalance is removed by the energization of motor 4 in the opposite sense to move the tap of the calibrating resistor back towards its midpoint. Upon releasing the pushbutton 17, the switch 13 opens to re-establish the measuring circuit and the position of the comparison photocell CP is again adjusted, if necessary, to bring the recorder reading to the known gloss of the standard specimen.

The later reclosures of switch 13 manually or by the clock mechanism C direct the standardizing beam s into the housing 2 of test photocell TP in place of the measuring beam, and substitute the previously set standard potentiometer 11 for the measuring potentiometer P. If there has been a drift from the previous calibration, the opposing voltages at the balance terminals X, Y are unequal and the motor 4 is energized to adjust the tap of the calibrating resistor to re-establish a balance. The initial ratio of the comparison photocell current through standard potentiometer 11 (and measuring potentiometer P when switch 13 is opened) to the current from the test photocell TP is thus restored, i. e. the measuring system is restandardized.

The described adjustments are made after power has been applied to the apparatus for from one-half hour to an hour to permit the photocells in the exposure head to come to a temperature equilibrium so that the response of the apparatus is stable. The purpose and effect of the calibrating adjustment is to bleed off or by-pass around the measuring potentiometer P a part of the current output of the comparison photocell CP such that the active current through the potentiometer P is a predetermined multiple of the current output of the test photocell TP when illuminated by the standard beam s.

The current output of the comparison photocell CP is of the order of 100 times that of the test photocell TP, and the fraction of the total current which is led off through the potentiometer tap to establish the voltage balance of the amplifier input terminals X, Y, is therefore small relative to the total current. The resistance 9 is relatively high and the balancing current is therefore proportional to the potentiometer setting to within a few tenths of one percent. The potential across the test photocell TP is zero at the balance condition, and the test current is essentially a linear function of light reaching the photocell. Therefore gloss of a specimen is proportional to the potentiometer setting to within a fraction of one percent.

Periodic standardizing or calibration is essential to maintain this high accuracy since the light-current characteristic of a barrier layer photocell varies with temperature, and a further calibration drift may arise from accumulations of dust and dirt on the lenses of the exposure head. The particular design and construction of the recorder per se, including the electrical and mechanical devices for periodically shifting from the measuring to a standardizing operation, are not essential features of the present invention. As presently manufactured commercially, the clock mechanism of recording potentiometer instruments closes the self-standardizing switch every fifteen minutes, but other re-standardizing intervals may of course be selected.

The constructional details of a 75° gloss exposure head according to the invention are shown in Figs. 2 to 4 inclusive. The housing I is a rectangular sheet metal box with the forward edges of the end, top and bottom walls turned over to form a flange to which a removable front plate or wall 21 is secured by screws. The housing is carried by a mounting arm 22 which may be secured to a rigid support to position the exposure head closely adjacent the specimen SP which may be, for example, a sheet of coated paper in transit through a stack of supercalender rolls. The lower wall of the exposure head is reinforced by a relatively heavy plate 23 having a narrow rectangular opening therethrough for the passage of the measuring beam m. An apertured plate or socket 24 is mounted on the bottom wall to receive a pre-focused lamp bulb which constitutes the light source E.

The plate 3 is secured to the bottom wall to extend tranversely across the housing, the plate having openings M and ST therethrough for the passage of the measuring beam m and the standardizing beam s. The shutter S is pivoted upon the plate 3 and normally held in clockwise position by a spring 26 to clear the measuring beam opening M. The solenoid 16 for shifting the shutter to its alternative position is supported within a small box 27 at the rear of the housing 1, and a cable socket 28 is mounted on a wall of the box 27 to receive a cable 29 which includes the wires for the solenoid circuit and for the light source E. The lens L' for focusing the beam s is mounted upon a baffle plate 30 which extends transversely of the housing.

The comparison photocell CP is located in a small box or sub-housing 31 which extends over an opening in the top wall of the housing 1, and a socket 32 for a four wire cable 33 (the wires comprising the photocell leads 5, 5', 6 and 6' of Fig. 1) is mounted on a wall of the box 31. The photocell CP is carried by a hinged strap 18 which is biased away from the light source E by a spring 19 and may be adjusted towards the source E by a screw 20. The heat-absorbing filter F is supported by and beneath the top wall to extend across the opening through which light rays reach the comparison photocell CP, and the collimating lens CL is mounted upon a plate 34 which is secured to the rear wall of the housing.

A flexible tube or conduit 35 opens into the housing I to admit filtered air under low pressure to establish a slow flow of air outwardly through the opening in the window plate 23, thereby to preclude the entrance of dust, lint and dirt into the housing. The tube 35, and cables 29 and 33 are supported on the mounting arm 22 by a ring or rings 36.

An alternative and presently preferred exposure head for a continuous gloss measuring and/or recording device is shown in Figs. 5 to 7 inclusive. The construction is similar to that previously described except for the elements for establishing the standard light beam s. A partition 36 in the general form of a shallow inverted pan is arranged over the opening in the bottom wall, and the lower flanged edge of the partition is sealed upon a dust-tight gasket 37, whereby dust and lint are excluded from the upper section of the housing. The lens L is mounted in an opening in the end wall of the partition adjacent the light source E, and the opening at the opposite end for admitting light rays to the sub-housing is similarly sealed by a transparent window 38. A shutter 39 of arcuate form is pivotally supported on a mounting plate 40 for rocking movement by a solenoid 16' from normal position outside of the path of the measuring beam m, as shown in Fig. 5 and by dotted line in Fig. 6, into its alternative position, shown by dot and dash line in Fig. 6, to block the measuring beam m and establish a standard beam s to the test photocell. The standard beam s is reflected through the lens L and window 38 by a mirror 41 carried by a flexible metal strap 42. The mirror 41 may be adjusted angularly by a screw 43 which is threaded through the end wall of the housing 1.

Dust or lint which enters the lower part of the housing can not enter the sub-housing 2 of the test photocell TP, nor can it reach and deposit upon the mirror 41. Both the measuring beam m and the standard beam s pass through the lense L and window 38, and the re-standardization of the measuring circuit therefore compensates for reductions in light transmission efficiency which are due to dust collecting upon these surfaces.

As shown in Figs. 8 to 12 inclusive, the geometric and spectral design of the exposure head may be varied in accordance with the optical property which is to be measured. The illustrated apparatus is intended primarily for use with sheet material for measurement of 45°, 0° reflectance with tristimulus filters, and it includes mechanism for restandardization when associated with a potentiometer measuring system such as illustrated in Fig. 1.

The exposure head comprises a rectangular box 44 having a removable front cover 45, and divided internally into two chambers by a partition plate having a horizontal central section 46 between end sections 47, 47' which extend downwardly and outwardly from the central section 46 at angles of 45°. A socket plate 48 for receiving a lamp bulb E is secured to the horizontal portion 46 of the partition plate midway between the end walls of the housing 44. Lenses 49, 49' are supported by a strap or lamp housing 50 to direct light beams horizontally from the lamp bulb E towards mirrors 51, 51' at opposite ends of the housing 44. The mirrors are supported from the housing walls by flexible metal straps 52, 52' and their inclination may be adjusted by screws 53, 53' to direct the light beams downwardly through lenses 54, 54' on partition sections 47, 47' respectively, to converge upon a specimen SP positioned below a glass plate 55 secured across an opening in the lower wall of the exposure head.

A lens 56 is supported above the lamp bulb E to direct rays towards a diffusing mirror 57 for reflection to a comparison photocell CP carried by a bracket 58 secured to the top wall of housing 44. The mirror 57 is supported from the top wall by a hinge 59 and is angularly adjustable from the exterior of the housing by a screw 60 which displaces the mirror in opposition to a bias provided by a spring 61.

A test photocell TP is secured to the lower surface of the horizontal partition portion 46, being located directly above the center of the window opening through which the two light beams are incident upon the specimen SP at angles of 45°, i. e. the reflectance is measured at 0° or from a point on a line normal to the surface of the specimen.

A series of filters for tristimulus colorimity is provided on an apertured turntable 62 rotatably supported below the test photocell TP by a shaft 63 which extends upwardly to the exterior of the housing 44 where it is provided with an adjusting dial 64. As shown in Fig. 10, the turntable 62 has three openings therethrough, and amber, blue and green filters A*m*, B*l* and G*r*, respectively, are arranged over or within the openings. The edge of the turntable is provided with notches 65 which cooperate with an index spring 66 to facilitate the accurate positioning of the filters with respect to the test photocell TP.

The mechanism for restandardization comprises a solenoid 16″ having an armature 67 for actuating a lever 68 to shift a frame 69, which carries a specimen SR of known reflectance, from an inoperative position at the rear of the housing into operative position over the window opening of the exposure head. The frame 69 is guided by a pair of parallel rods 70 on which a stop strip 71 is fixed for arresting the movement of the standard specimen frame into active position. The frame 69 is normally retained in its inactive position by a spring 72.

The initial standardization of the reflectance exposure head is effected in substantially the same manner as described above for standardization of the 75° gloss exposure head, and the periodic or manually selected restandardizations take place in a similar manner.

The apparatus as illustrated in Figs. 1 to 7 is intended particularly for the continuous measurement of the surface gloss or reflectance of a moving sheet or web, and the periodic restandardization insures high accuracy over long periods. In the case of apparatus which is to be used from time to time for the measurement of an optical property of separate specimens, it is preferable to maintain a continuous restandardization by substituting a normally closed switch for the normally open switch 13 of Fig. 1. When a measurement is to be made, the normally closed switch is opened manually and held open until the measurement is completed by the actuation of motor 4 to establish a voltage balance at the terminals X, Y.

It will be apparent that the described method of restandardizing photoelectric comparator instruments may be employed with simpler constructions which do not include a motor for adjusting the contact arms of the measuring potentiometer P and the calibrating resistance CR to balance the measuring system. In such simpler constructions, the amplifier A and motor 4 will be replaced by a sensitive galvanometer connected across the balance points X, Y, and the contact arms will be adjusted manually for measurements and restandardization.

It is to be understood that the invention is not limited to the particular apparatus herein shown and described as various modifications which may occur to those familiar with the design and construction of photoelectric apparatus for measuring optical quantities fall within the spirit and scope of the invention as set forth in the following claims.

I claim:

1. In a photoelectric comparator instrument, the combination of a light source, a comparison photocell illuminated by said light source, a test photocell illuminated from said light source by a measuring beam of rays reaching said test photocell from a specimen under test, a measuring circuit including a measuring potentiometer having a contact movable to balance the current output of the test photocell by a fraction of the current output of the comparison photocell, a graduated scale of an optical value along which a pointer moves in accordance with the adjustment of the movable contact of the measuring potentiometer, an adjustable calibrating resistance shunted across said comparison photocell, and means for adjusting the light energy incident upon the comparison photocell to bring the pointer to the known optical value of a standard specimen from which a beam of rays reaches the test photocell when the measuring potentiometer is adjusted for a balance at a preselected setting of the calibrating resistance.

2. In a photoelectric comparator instrument, the invention as recited in claim 1, wherein said last mentioned means includes hinge means supporting said comparison photocell for angular movement towards or away from said light source, spring means urging said comparison photocell in one direction of angular movement, and a threaded screw for moving said comparison photocell in the opposite direction.

3. In a photoelectric comparator instrument, the invention as recited in claim 1, wherein said measuring circuit comprises circuit elements including switch means for connecting said measuring potentiometer across said comparison photocell and for connecting said test photocell between the movable contact and one end of said measuring potentiometer for measurement of an optical value of a specimen under test; in combination with means for restandardizing the instrument at intervals between measuring operations, said restandardizing means including a standardizing potentiometer having an adjustable contact arm, said switch means being adjustable to open said connections of the photocells to said measuring potentiometer and to connect the same in analogous relation to said standardizing potentiometer, beam-adjusting means operable simultaneously with such adjustment of said switch means for restandardizing to substitute for said measuring beam of rays to said test photocell a standard ray of beams, and means responsive to an unbalance of the current outputs of said photocells at the existing setting of the contact arm of the standardizing potentiometer for altering the magnitude of the comparison photocell current through said measuring potentiometer on the subsequent adjustment of said switch means for a measuring operation to compensate for calibration variants.

4. In a photoelectric comparator instrument, the invention as recited in claim 3, wherein said beam-controlling means includes means for moving a standard specimen of known optical value into position to pass a beam of rays to said test photocell during a restandardizing operation.

5. In a photoelectric comparator instrument, the invention as recited in claim 3, wherein said means responsive to an unbalance of currents includes motor-means energized by a current unbalance for operation to an extent sufficient to eliminate the unbalance between the current output of the test photocell and that fraction of the current output of the comparison photocell determined by the existing setting of the contact arm of the standardizing potentiometer.

6. In a photoelectric comparator instrument, the combination with a light source, a comparison photocell directly illuminated by said light source, a test photocell illuminated from said light source by a measuring beam of rays reaching said test photocell from a specimen under test, a measuring circuit including a measuring potentiometer having a resistance element and a contact movable along the same to balance the current output of the test photocell by a fraction of the current output of the comparison photocell, circuit elements connecting said comparison photocell across the resistance element of said potentiometer, circuit elements connecting said test photocell between said contact and one end of said potentiometer resistance element to establish therebetween a test photocell current of opposite polarity to the comparison photocell current in said resistance element, reversible motor means energized by an unbalance of the voltage drops established by said opposing polarity currents to adjust said potentiometer contact to establish a balance, and a graduated scale of an optical value along which a pointer moves in accordance with the adjustment of the movable contact of said potentiometer; of means for restandardizing said measuring circuit at intervals between measuring operations, said restandardizing means including a second potentiometer, switch means operable from a measuring position to a restandardizing position to connect said second potentiometer in said measuring circuit in place of said measuring potentiometer, means operable simultaneously with adjustment of said switch means to restandardizing position to move a standard specimen of known optical value into position to pass to said test photocell a standard beam of rays from said standard specimen in place of the previously established measuring beam of rays, and reversible motor means operative in the event of an unbalance of voltages established between the contact of said second potentiometer and one end of the resistance element thereof by opposite polarity currents from said photocells to adjust the current input from said comparison photocell to said second potentiometer to reestablish a voltage balance.

7. In a photoelectric comparator instrument, the invention as recited in claim 1, in combination with a manually adjustable standard potentiometer, switch means for connecting said standard potentiometer in the measuring circuit in place of the measuring potentiometer, and beam-controlling means for substituting for said measuring beam of rays to said test photocell a standard beam of rays, the contact arm of the standard potentiometer being adjustable to balance the measuring circuit at said preselected setting of the calibrating resistance for which the light energy incident upon the comparison photocell was adjusted for initial calibration of the instrument.

8. In a photoelectric comparator instrument, the invention as recited in claim 7, wherein said beam-controlling means comprises shutter means for interrupting said measuring beam of rays and establishing a standard beam of rays along a path differing in part from the path of the measuring beam of rays.

9. In a photoelectric comparator instrument, the invention as recited in claim 7, wherein said beam-controlling means includes means for moving a standard specimen of known optical value into position to pass a beam of rays to the test photocell.

10. In a photoelectric comparator instrument, the combination with a comparison photocell, a test photocell, a light source for directly illuminating said comparison photocell and for illuminating said test photocell by light from a specimen under test, a measuring circuit including a measuring potentiometer connected across said comparison photocell and having a contact arm movable to establish a balance between the current developed by said test photocell and a fraction of the current developed by the comparison photocell, said circuit including an adjustable calibrating resistance connected across said comparison photocell, and a reversible motor responsive to an unbalance condition and having a drive connection to said contact arm of the measuring potentiometer to adjust the same to re-establish a balance, of means for restandardizing the measuring circuit; said restandardizing means including beam-control means for illuminating said test photocell by a standard beam of rays, a standard potentiometer, switch means for substituting said standard potentiometer for said measuring potentiometer in the measuring circuit, and drive-control means for breaking the drive connection from said motor to said contact arm of the measuring potentiometer and establishing a drive connection to said adjustable calibrating resistance.

11. In a photoelectric comparator instrument, the invention as recited in claim 10, in combination with a relay circuit including a switch and solenoid means for simultaneously actuating said beam-control means, said switch means and said drive-control means.

12. In a photoelectric comparator circuit, the invention as recited in claim 11, in combination with clock means for periodically closing said switch of the relay circuit.

RICHARD S. HUNTER.

REFERENCES CITED

The following references are of record in the file of this patent:

UNITED STATES PATENTS

| Number | Name | Date |
| --- | --- | --- |
| 1,834,905 | Sheldon | Dec. 1, 1931 |
| 1,919,182 | FitzGerald | July 18, 1933 |
| 1,971,317 | Sheldon et al. | Aug. 21, 1934 |
| 2,015,675 | Hays | Oct. 1, 1935 |
| 2,019,871 | Pettingill et al. | Nov. 5, 1935 |
| 2,104,525 | Proskouriakoff | Jan. 4, 1938 |
| 2,139,489 | Cockrell | Dec. 6, 1938 |
| 2,189,582 | Hineline | Feb. 6, 1940 |
| 2,215,211 | Devol | Sept. 17, 1940 |
| 2,244,732 | Schmitt | June 10, 1941 |
| 2,423,540 | Wills | July 8, 1947 |
| 2,428,806 | Liben et al. | Oct. 14, 1947 |
| 2,471,750 | Hunter | May 31, 1949 |